United States Patent
Yonge, III et al.

(10) Patent No.: US 9,749,100 B2
(45) Date of Patent: Aug. 29, 2017

(54) MULTIBAND ETHERNET OVER COAX SYSTEM

(71) Applicant: QUALCOMM Incorporated, San Diego, CA (US)

(72) Inventors: Lawrence Winston Yonge, III, Summerfield, FL (US); Gregory Allen Magin, Ocala, FL (US); Brian James Langlais, Almonte (CA)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 14/801,636

(22) Filed: Jul. 16, 2015

(65) Prior Publication Data

US 2017/0019220 A1   Jan. 19, 2017

(51) Int. Cl.
  *H04L 5/00* (2006.01)
  *H04B 3/54* (2006.01)

(52) U.S. Cl.
  CPC ............. *H04L 5/003* (2013.01); *H04B 3/542* (2013.01)

(58) Field of Classification Search
  CPC ............ H04L 5/003; H04B 3/54; H04B 3/542
  See application file for complete search history.

(56) References Cited

U.S. PATENT DOCUMENTS

| | | | |
|---|---|---|---|
| 6,040,759 A | 3/2000 | Sanderson | |
| 7,113,484 B1 | 9/2006 | Chapman et al. | |
| 7,418,240 B2 | 8/2008 | Hsu et al. | |
| 7,583,704 B1 | 9/2009 | Walker et al. | |
| 8,325,613 B2 | 12/2012 | Okamoto | |
| 2011/0286339 A1* | 11/2011 | Masuda | H04B 3/542 370/248 |
| 2013/0188670 A1* | 7/2013 | Sun | H04B 3/54 375/211 |
| 2014/0341309 A1* | 11/2014 | Nguyen | H04B 3/54 375/257 |
| 2015/0098375 A1* | 4/2015 | Ree | H04W 52/0296 370/311 |

FOREIGN PATENT DOCUMENTS

WO   2013016281 A1   1/2013

OTHER PUBLICATIONS

International Search Report and Written Opinion—PCT/US2016/036937—ISA/EPO—dated Aug. 30, 2016.

* cited by examiner

*Primary Examiner* — Paul H Masur
(74) *Attorney, Agent, or Firm* — The Marbury Law Group

(57) ABSTRACT

Described herein are apparatuses and methods for providing communication in multiple frequencies in a multiband Ethernet over Coax (EoC) system. An exemplary apparatus comprises a transceiver for transmitting or receiving a first data packet on a first channel associated with a first frequency, and a transmitter for transmitting a second data packet on at least one second channel associated with at least one second frequency.

25 Claims, 3 Drawing Sheets

_US 9,749,100 B2_

MULTIBAND ETHERNET OVER COAX SYSTEM

TECHNICAL FIELD

The present application generally relates to Ethernet over Coax (EoC) systems.

BACKGROUND

EoC supports the transmission of Ethernet frames over coaxial cable. Powerline communication (PLC) integrated circuits (ICs) have been adapted for EoC systems, to deliver data, video, and voice services over existing coaxial cable, for example, in apartment buildings. An EoC system uses single-input single-output (SISO) PLC ICs and operates in the about 2-67 MHz frequency band. The ICs provide approximately 400-500 Mbps peak physical (PHY) data rate and approximately 300 Mbps application data throughput after overhead. To keep up with increasing demand for application data throughput, there is a requirement to increase the data rates to greater than 1 Gbps. Since the current frequency band is already operating near maximum capacity, additional frequency bands are required to produce higher application data throughput.

SUMMARY

Described herein are various implementations of multi-band EoC systems. In some embodiments, a device provides communication in multiple frequencies. The device comprises a transceiver for transmitting or receiving a first data packet on a first channel associated with a first frequency; and a transmitter for transmitting a second data packet on at least one second channel associated with at least one second frequency.

In some embodiments, the at least one second channel comprises at least three second channels.

In some embodiments, the transmitter comprises multiple transmitters.

In some embodiments, the second data packet comprises a data payload and an acknowledgment for receiving the first data packet.

In some embodiments, the device further comprises a scheduler for generating a schedule comprising time allocation and channel assignment for a second device.

In some embodiments, the first data packet comprises an initial schedule and the second data packet comprises an updated schedule.

In some embodiments, the first frequency is equal to or greater than about 2 MHz and less than about 67 MHz, and the at least one second frequency is equal to or greater than about 67 MHz.

In some embodiments, the transceiver operates simultaneously with the transmitter.

In some embodiments, the device further comprises a switch for switching between the first channel and the at least one second channel.

In some embodiments, the at least one second channel comprises a number of second channels based on a throughput requirement associated with the device.

In some embodiments, a device is provided for receiving communication in multiple frequencies. The device comprises a transceiver for transmitting or receiving a first data packet on a first channel associated with a first frequency; and a receiver for receiving a second data packet on at least one second channel associated with at least one second frequency, wherein the receiver is tuned to the at least one second frequency.

In some embodiments, the at least one second channel comprises at least three second channels, and wherein the device is configured to select one second channel from the at least three second channels.

In some embodiments, the receiver comprises multiple receivers.

In some embodiments, the second data packet comprises a data payload and an acknowledgment for transmitting the first data packet.

In some embodiments, at least one intervening packet is transmitted on the first channel between the transmission of the first data packet and the reception of the second data packet.

In some embodiments, the first frequency is equal to or greater than about 2 MHz and less than about 67 MHz, and the at least one second frequency is equal to or greater than about 67 MHz.

In some embodiments, the transceiver operates simultaneously with the receiver.

In some embodiments, the device further comprises a switch for switching between the first channel and the at least one second channel.

In some embodiments, the device further comprises a converter for converting data associated with the first frequency to data associated with the at least one second frequency.

In some embodiments, the device is further configured to determine a bit loading for the first channel or the at least one second channel.

In some embodiments, a method is provided for communicating between a first device and a second device on a network. The method comprises transmitting a first data packet on a first channel associated with a first frequency from the first device to the second device, the first channel providing two-way transmission between the first device and the second device; and transmitting a second data packet on at least one second channel associated with at least one second frequency from the first device to the second device, the at least one second channel providing one-way transmission from the first device to the second device.

In some embodiments, the method further comprises receiving on the first channel from the second device an acknowledgment for the transmission of the first data packet or the transmission of the second data packet.

In some embodiments, the at least one second channel comprises at least three second channels.

In some embodiments, the method further comprises generating a schedule comprising time allocation and channel assignment for the second device.

In some embodiments, the method further comprises switching between the first channel and the at least one second channel.

In some embodiments, an apparatus is provided for communication with a second apparatus. The apparatus comprises means for transmitting a first data packet on a first channel to a second apparatus, the first channel associated with a first frequency, means for transmitting a second data packet on at least one second channel to the second apparatus, the at least one second channel associated with a second frequency; and means for controlling the transmission of the first data packet and the transmission of the second data packet.

In some embodiments, the apparatus further comprises means for receiving on the first channel from the second apparatus an acknowledgment for the transmission of the first data packet or the transmission of the second data packet.

In some embodiments, the apparatus further comprises means for converting data associated with the first frequency to data associated with the at least one second frequency.

In some embodiments, the apparatus further comprises means for generating a schedule comprising time allocation and channel assignment for the second apparatus.

In some embodiments, the apparatus further comprises means for switching between the first channel and the at least one second channel.

In some implementations, a computer readable medium is provided for communicating in multiple frequencies. The computer readable medium comprises computer executable code configured to perform the various methods described herein.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

Although similar reference numbers may be used to refer to similar elements for convenience, it can be appreciated that each of the various example embodiments may be considered distinct variations.

DETAILED DESCRIPTION

Figure 1:
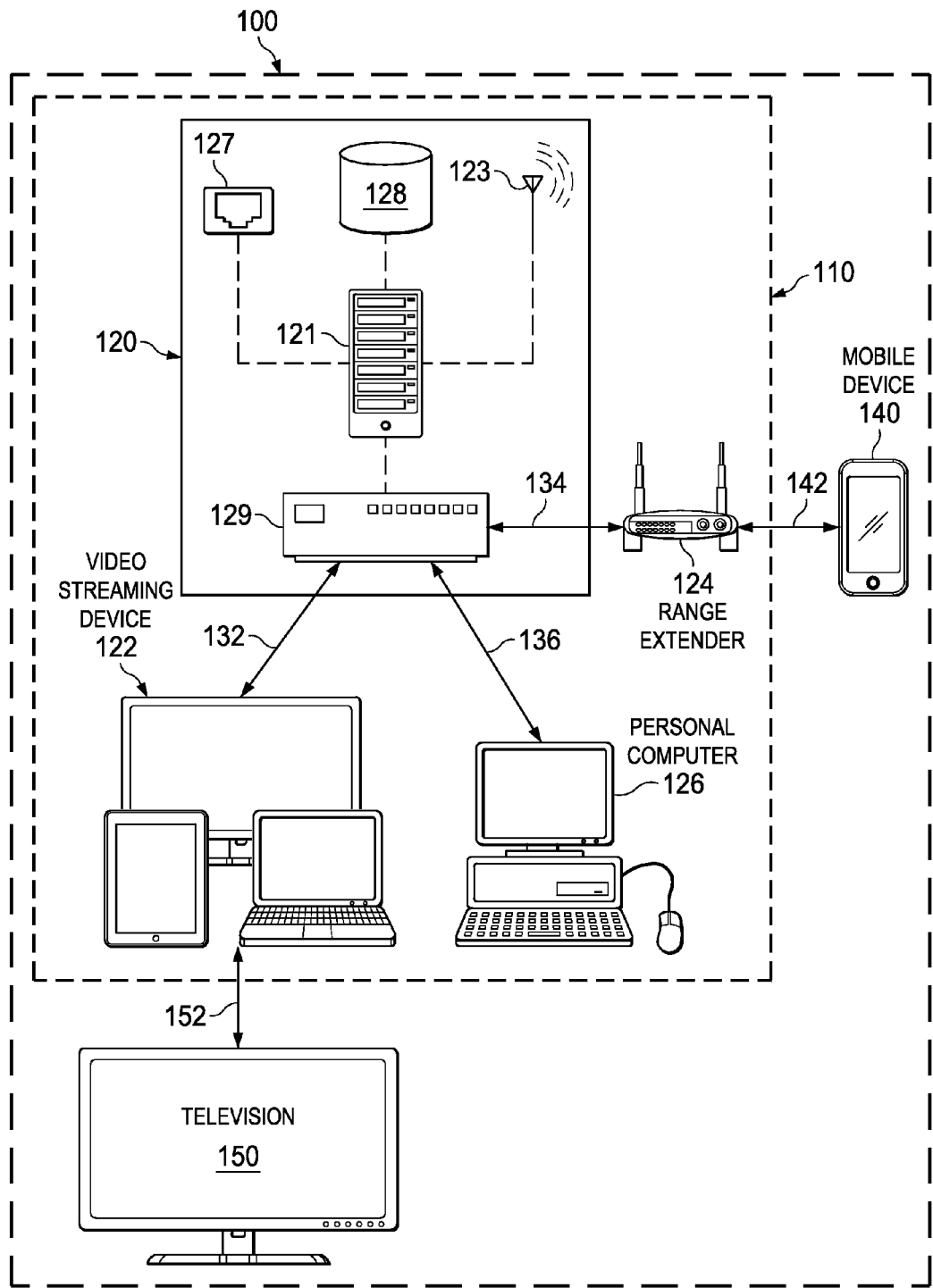
FIG. 1 is a diagram of a network environment for communicating between nodes on a network.

FIG. 1 shows a network environment system 100 for communicating between nodes on a network. A PLC network is an exemplary network for implementing this disclosure. However, other networks may also be used for implementing this disclosure. As used herein, a node may represent any of the devices or device components shown in FIG. 1, including, but not limited to, an access point 120, a range extender 124, a video streaming device 122, a personal computer 126, a television 150, and a mobile device 140. Any of the nodes described herein may represent either a master device or a client device. The system 100 includes PLC networks deployed in a home, work place, automobile, or other environment having a powerline infrastructure. The system 100 may comprise an access point 120 that receives connectivity to an external network (e.g., the internet) via a port 127. The connectivity to the external network may be established via a wired connection or a wireless connection, which may use a cellular protocol such as a 2G, 3G, or 4G LTE protocol. The access point 120 may, for example, be an internet gateway router that may comprise a wireless transceiver 123 to provide wireless connectivity (e.g., Wi-Fi) to local devices in addition to the PLC connectivity described below. The access point 120 may additionally or alternatively comprise a wired transceiver (not shown) to provide wired connectivity (e.g., Ethernet) to local devices. In some embodiments, the access point 120 may utilize HomePlug® Access Broadband Power Line (BPL) protocols for coupling to a broadband backhaul network using the wiring of a public powerline infrastructure. Storage 128 may store computer executable instructions associated with any of the elements of FIG. 1.

The access point 120 may have a PLC modem 129 that enables it to transmit and receive messages over a plurality of PLC channels 132, 136, 134, forming a PLC network 110. The PLC network 110 may utilize an existing powerline infrastructure, and communications within the PLC network 110 may be implemented using a PLC protocol such as the HomePlug® 1.0, HomePlug® AV2, or the HomePlug® Green PHY protocols.

The access point 120 may communicate with the video streaming device 122 via the channel 132. The video streaming device 122 may deliver video data to a television 150 via a wired PLC or non-PLC channel or wireless non-PLC channel 152. The access point 120 may further communicate with the range extender 124 via a PLC channel 134 or a wireless non-PLC channel. The range extender 124 may serve to extend the range of the home network provided, at least in part, by the access point 120. For example, if the access point 120 provides a Wi-Fi network having a limited range, the range extender 124 could be established at a location to extend the range of Wi-Fi connectivity. Alternatively, the range extender 124 could provide wired connectivity at a separate location from the access point 120. As shown in FIG. 1, the range extender 124 may provide a connection 142 (e.g., Wi-Fi) to the mobile device 140. The range extender 124 may effectively act as a bridge between the PLC network 110 and another network (e.g., Wi-Fi network).

The access point 120 may further communicate with the personal computer 126 via the PLC channel 136. The computer 126 may comprise or be connected to its own PLC modem that sends and receives signals on the PLC channel 136. The computer 126 may be used for a variety of applications that utilize local and/or internet connectivity including gaming, media sharing, and internet browsing. A network coordination processor 121 may implement a control strategy associated with the PLC network 110.

The various channels described with respect to FIG. 1 may have multiple carriers having corresponding frequencies. A channel carries one or more bits of information or data between a transmitting device (e.g., access point 120) and a receiving device (e.g., personal computer 126). Transmitting devices and receiving devices on a network negotiate which carriers may be used to carry information (e.g., data payload) and the bitrate for each carrier. This information may be codified in a tone map that is sent from the transmitting device to the receiving device prior to a data payload transmission from the transmitting device to the receiving device. At least one of the transmitting or receiving device may select, either singly or in combination with each other, the carrier-specific bitrates (e.g., the values conveyed in the tone map) based on estimated signal-to-noise ratios (SNR) for each carrier. If a carrier has an SNR that is insufficient for sending even a single bit, as is possible through Binary Phase Shift Keying (BPSK), at least one of the transmitting or receiving device may determine not to use that carrier (e.g., by setting the carrier's bitrate value to 0 in the tone map). The various connections or channels 132, 134, 136, 142, and 152 may each comprise a primary channel 291 or one or more downstream channels 293, 294, 295 with respect to the system described in FIG. 2.

Figure 2:
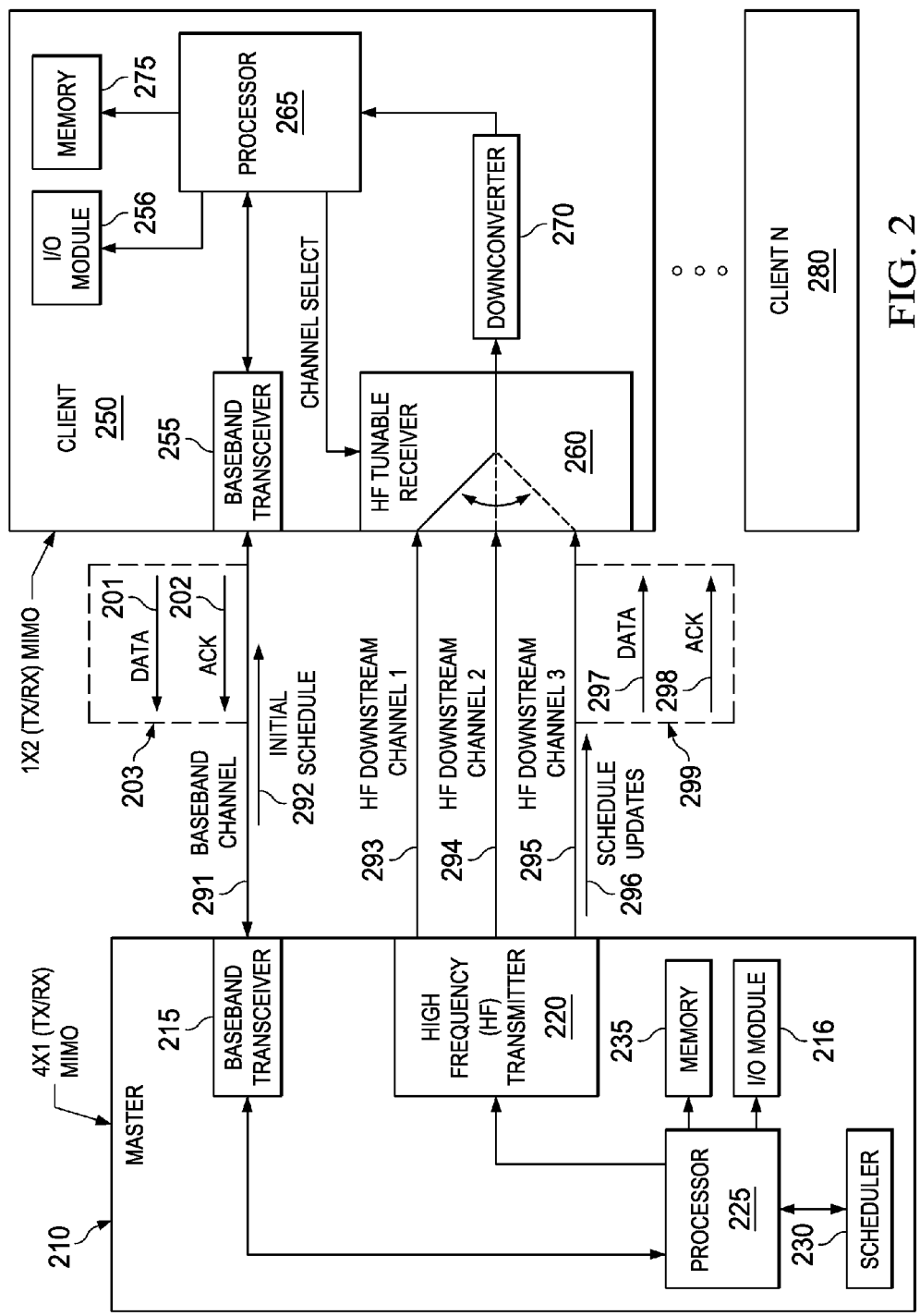
FIG. 2 is a diagram of a system comprising a master device and a client device.

FIG. 2 shows an exemplary system comprising a master device 210 and a client device 250. The system supports multiband operation. In some embodiments, the system not only operates in a low frequency band (greater than about 2 MHz and less than about 67 MHz), but also operates in a high frequency band (equal to or greater than about 67 MHz and less than about 1.5 GHz). The system support two-way communication between the master device 210 and the client device 250 (e.g., customer premise equipment) on the primary channel 291 in the legacy frequency band (or the baseband), and one-way downstream communication from the master device 210 to the client device 250 on three (or more) channels (the downstream channels 293, 294, 295) in the high frequency band. In some embodiments, the number of downstream streams is based on a throughput requirement associated with the master device 210. The throughput requirement defines the amount of data to be transmitted (and an accompanying data rate) from the master device 210 to the client device 250. As used herein, a client device may refer to a single client device 250 or multiple client devices 280. In some embodiments, the master device 210 may comprise 4 transmitters (TX) for every receiver (RX) (4×1 (TX/RX) MIMO), and the client device 250 may comprise 1 transmitter for every 2 receivers (1×2 (TX/RX) MIMO). Each transmitter and/or each receiver in the master device 210 and/or the client device 250 may be associated with a single channel or multiple channels. For example, in some embodiments, a separate transmitter is provided for each downstream channel 293, 294, 295. In some embodiments, the client device 250 may operate (e.g., at least one of receive or transmit) on a single channel at a time.

The master device 210 comprises a baseband transceiver 215 (e.g., for transmitting and receiving data on the primary channel 291, and transmitting the initial schedule on the primary channel 291), a high frequency transmitter 220 (e.g., for transmitting data on a downstream channel 293, 294, 295), a processor 225 (e.g., for controlling components in the master device 210 and performing the various functions of the master device 210), a scheduler 230 (e.g., for generating a schedule for time allocation and frequency assignment to the client device 250), and a memory 235 (e.g., for storing data needed for performing the various functions of the master device 210). The client device 250 comprises a baseband transceiver 255 (e.g., for transmitting and receiving data on the primary channel 291, and receiving the initial schedule on the primary channel 291), a high frequency (HF) tunable receiver 260 (e.g., for tuning to particular frequency associated with a downstream channel 293, 294, 295, and for receiving data transmitted on a downstream channel 293, 294, 295), a processor 265 (e.g., for controlling components in the client device 250 and performing the various functions of the client device 250), a downconverter 270 (e.g., for converting data from high frequency data to baseband or low frequency data), and a memory 275 (e.g., for storing data needed for performing the various functions of the client device 250).

The master device 210 may be implemented with multiple (e.g., four) PLC ICs, one in the primary channel 291 and one each in the downstream channels 293, 294, 295. Each PLC IC in the downstream channel 293, 294, 295 upconverts the about 2-67 MHz PLC signal to the respective downstream channel 293, 294, 295. Upconversion refers to converting low frequency or baseband data to high frequency data. The conversion (e.g., upconversion) of frequencies is achieved using one or more oscillators. The master device 210 may operate continuously and simultaneously across all channels. Therefore, the master device 210 associated with the PLC IC may simultaneously transmit and/or receive on the primary channel 291, while simultaneously transmitting on one or more downstream channels 293, 294, 295 to the client device 250. If a PLC IC operates using carrier sense multiple access (CSMA) peer-to-peer protocol, the PLC IC needs to be adapted to additionally or alternatively operate using time division multiple access (TDMA) protocol in an EoC environment. The client device 250 may be implemented to transmit and receive in the primary channel 291, and to tune and receive on one or more downstream channels 293, 294, 295. In some embodiments, the client device 250 may be able to continuously and simultaneously operate across both the primary channel 291 and downstream channels 293, 294, 295. In other embodiments, the client device 250 may be able to operate on a single channel (e.g., the primary channel 291 or one of the downstream channels 293, 294, 295) during a time period. In such embodiments, the client device 250 may be able switch from one channel to a second channel within a threshold period of time (e.g., a few microseconds). Since the downstream channels 293, 294, 295 are one-way channels from the master device 210 to the client device 250, acknowledgments cannot be transmitted from the client device 250 to the master device 210 on the downstream channels 293, 294, 295. Acknowledgment 202 of the transmission by the master device 210 on a downstream channel 293, 294, 295 is transmitted, on the primary channel 291, from the client device 250 to the master device 210.

Using the scheduler 230, the master device 210 generates a schedule (e.g., a TDMA schedule) that includes time allocation and frequency assignment (or channel assignment) for each client device 250 based on a particular traffic load between the master device 210 and each client device 250. The master device 210 may dynamically change the schedule to optimize traffic flow between the master device 210 and the client device 250. The master device 210 may communicate the schedule (e.g., an initial schedule 292) to the client device 250 via the primary channel 291. The master device 210 may communicate an updated schedule 296 to the client either via the primary channel 291 or via a downstream channel 293, 294, 295 (e.g., the downstream channel 293, 294, 295 assigned to the client device 250 by the master device 210). The updated schedule 296 may comprise an amendment to the initial schedule 292. As a further example, the scheduler 230 may dictate, in a schedule, that the client device 250 operate (e.g., transmit a data packet and/or receive a data packet) on a particular channel (e.g., the primary channel 291 or one of the downstream channels 293, 294, 295) during a time period. In the same time period, the scheduler 230 may dictate that the master device 210 operate on a different channel from the client device 250 in order to prevent any operational conflicts between the master device 210 and the client device 250. During this time period, the scheduler 230 may also dictate, in the schedule, that the client device 250 is not permitted to switch its operation to the channel on which the master device 210 is operating, and the master device 210 is not permitted to switch its operation to the channel on which the client device 250 is operating. In alternate implementations, the scheduler 230 may dictate, in the schedule, that the client device 250 is permitted to operate on the same channel at the same time as the master device 210.

A channel adaptation procedure may be performed by the client device 250 (e.g., receiver 260 in client device 250). The channel adaptation procedure comprises determining a bit loading for a channel (e.g., primary channel 291 or downstream channel 293, 294, 295) from the master device 210 to the client device 250. The determined bit loading is transmitted from the client device 250 to the master device 210 on the primary channel 291. In some embodiments, a particular client device 250 may operate only on the primary channel 291 or only one on downstream channel 293, 294, 295 during a period of time. The operation of the primary channel 291 or a downstream channel 293, 284, 295 during certain periods of time may be determined by a scheduler 230.

In some embodiments, the downstream channels 293, 294, 295 are used for transmitting nearly all downstream data from the master device 210 to the client device 250. Therefore, the primary channel 291 may not be used for transmitting downstream data from the master device 210 to the client device 250. In some embodiments, however, even the primary channel 291 may be used for transmitting at least some downstream data from the master device 210 to the client device 250. Exemplary downstream data includes data payload 297, downstream management data, schedule data, acknowledgment 298 by the master device 210 to client data payload 201 transmitted on the primary channel 291 from the client device 250 the master device 210, etc. In some embodiments, the primary channel 291 is used for transmitting upstream data from the client device 250 to the master device 210. Exemplary upstream data includes data payload 201, upstream management data, schedule data, acknowledgment 202 by the client device 250 to master data payload 297 transmitted on the downstream channel 293, 294, 295, or from the primary channel 291, from the master device 210 to the client device 250. In some embodiments, a same data packet 203, 299 may comprise data payload, management data, schedule data, and acknowledgments. Therefore, the data packet 203, 299 may comprise data fields for data payload, management data, schedule data, and acknowledgments.

An acknowledgment transmitted from a first device (e.g., a master device 210 or a client device 250) to a second device (e.g., a client device 250 or a master device 210) may acknowledge a data packet 203, 299 (e.g., comprising data payload 201, 297) that was received by the second device immediately before transmitting the acknowledgment. In some embodiments, the second device may acknowledge (or transmit an acknowledgment for) a data packet 203, 299 that was received by the second device during a certain period of time before transmitting the acknowledgment 298, 202 (e.g., other subsequent data packets may have been received between the time of receiving the data packet and transmitting an acknowledgment for the data packet). Also, in some embodiments, the acknowledgment 298, 202 for a data packet 203, 299 may be transmitted from the second device to the first device on a different channel from the channel on which the data packet 203, 299 was received at the second device from the first device.

As described herein, a master device 210 may comprise at least one IC. An exemplary IC may comprise at least two MIMO (multiple-input multiple-output) channels. One of the MIMO channels may be connected to the primary channel 291 (e.g., a coaxial channel). One of the other MIMO channels may be connected to a receiver 260 (e.g., in the client device 250) that is tuned to one of the downstream channels 293, 294, 295, as assigned to the client device 250 (and/or receiver 260 in the client device 250) by the master device 210. One or more registers in the master device 210 (and/or the client device 250) may be implemented to turn on and off (e.g., within a threshold period of time) each of the various channels described herein. Turning on and off channels at the client device 250 may be implemented using a channel adaptation procedure. A tone map may be used for turning on and off a particular channel during a particular period of time. For example, for a certain period of time, a tone map provides no bit loading for one channel (e.g., an inactive channel) and provides bit loading for another channel (e.g., an active channel). For a certain period of time, the active channel may be the primary channel 291, and the inactive channel may be one or more of the downstream channels 293, 294, 295. For another period of time, the inactive channel may be the primary channel 291, and the active channel may be one or more of the downstream channels 293, 294, 295. Embodiments of the disclosure provide for switching (e.g., within a threshold period of time such as a few microseconds) of tone maps from one period of time to another period of time. The tone maps may be switched based on a schedule provided by the scheduler 230. Any of the modules or elements in the master device 210 or client device 250 can be implemented in hardware, software, or a combination of hardware and software. Where a module is implemented, at least in part, in software, the software may be stored in a non-volatile, machine-readable medium.

Processor 225 or 265 may control any of the other modules and/or functions performed by the various modules in the master device or the client device. For example, the processor 265 in the client device 250 may select one of the downstream channels 293, 294, 295 such that the receiver 260 tunes itself to a frequency associated with the selected downstream channel and prepares to receive and receives data transmitted on the selected downstream channel. Any actions described as being taken by a processor may be taken by the processor alone or by the processor in conjunction with one or more additional components. Additionally, while only one processor may be shown in certain devices, multiple processors may be present. Thus, while instructions may be discussed as being executed by a processor, the instructions may be executed simultaneously, serially, or otherwise by one or multiple processors. A processor may be implemented as one or more CPU chips and may be a hardware device capable of executing computer instructions. The processor may execute instructions, codes, computer programs, or scripts. The instructions, codes, computer programs, or scripts may be received from an I/O module 216 or from memory 235 for the master device 210, and from I/O module 256 or from memory 275 for the client device 250.

As used herein, I/O module 216, 256 may include modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. In some implementations, the I/O modules 216 and 256 may be integral parts of the processors 225 and 265, respectively. The I/O modules 216 and 256 may have distributed functionality across multiple hardware components in the master device 210 and the client device 250, respectively. In other implementations, the I/O modules 216 and 256 may be separate from the processors 225 and 265, respectively, and may be controlled by the processors 225 and 265, respectively. In some alternate implementations, I/O modules 216 and 256 may also include or incorporate the functionality of liquid crystal displays (LCDs), touch screen displays, keyboards, keypads, switches, dials, mice, track balls, voice recognizers, card readers, paper tape readers, printers, video monitors, or other well-known input/output devices.

As used herein, memory 235 or 275 may include random access memory (RAM), read only memory (ROM), or various forms of secondary storage. RAM may be used to store volatile data and/or to store instructions that may be executed by a processor. ROM may be a non-volatile memory device that may have a smaller memory capacity than the memory capacity of a secondary storage. ROM may be used to store instructions and/or data that may be read during execution of computer instructions. Access to both RAM and ROM may be faster than access to secondary storage. Secondary storage may be comprised of one or more disk drives or tape drives and may be used for non-volatile storage of data or as an over-flow data storage device if RAM is not large enough to hold all working data. Secondary storage may be used to store programs that may be loaded into RAM when such programs are selected for execution.

As used herein, networks may represent any form of communication network between connected machines and any other network elements, and may also represent a collection of machines or virtual machines operable to provide cloud computing services to users. Networks may include a public cloud or a private cloud. Networks may include routers, hubs, switches, firewalls, content switches, gateways, call controllers, and/or any other suitable components in any suitable form or arrangement. Networks may include, in whole or in part, one or more secured and/or encrypted Virtual Private Networks (VPNs) operable to couple one or more network elements together by operating or communicating over elements of a public or external communication network. A network as described herein may be a wired or wireless network.

A node may include any device with a network interface, which includes, but is not limited to, a network component, a desktop computer, a laptop, a mobile device, a television, a watch or wristband, a laptop computer, a smart screen, a tablet computer, a desktop computer, an electronic reader, a scanner, a portable media player, a mobile computing device, a mobile phone, a wearable device (e.g., wearable on a user's arm), headgear, a gaming device, a kiosk, or an Internet of Things (IoT) device. A node may be a virtual machine, computer, device, instance, host, or machine in a networked computing environment. As used herein, the terms node, device, system, and apparatus are equivalent and may be used interchangeably.

Figure 3:
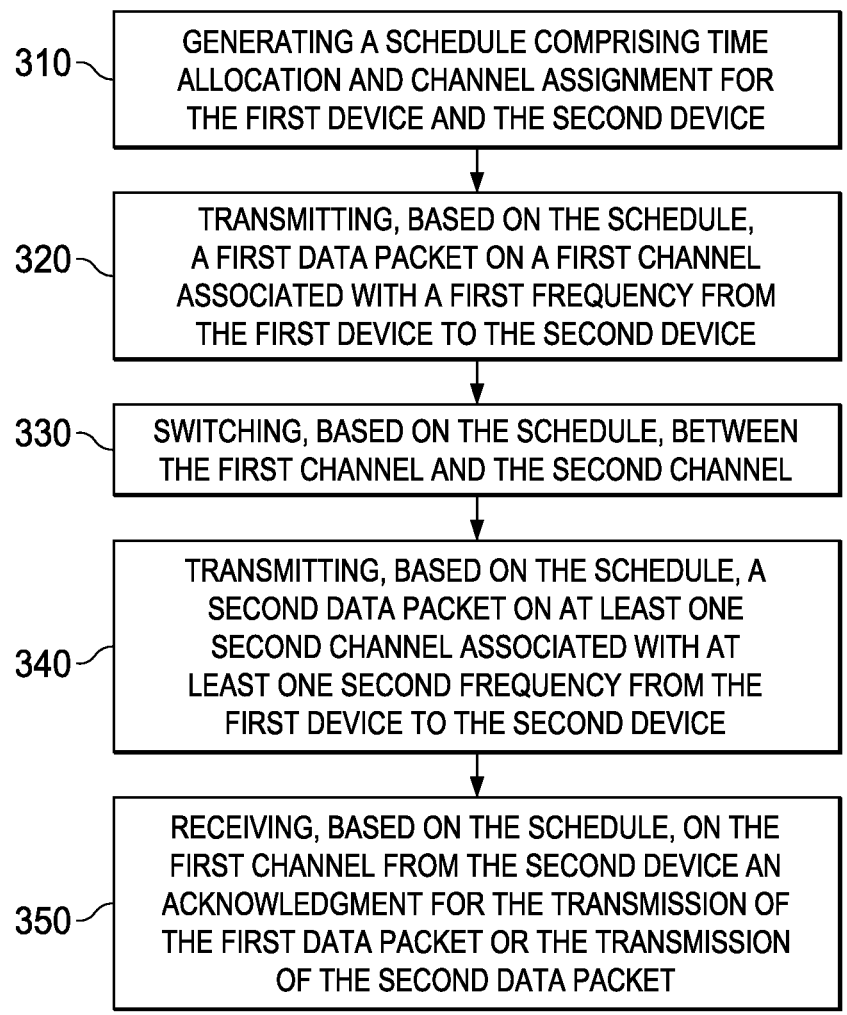
FIG. 3 is a diagram of a method for communicating between a first device (e.g., a master device) and a second device (e.g., a client device) on a network.

FIG. 3 is a diagram of an embodiment of a method for providing communication in multiple frequencies. In this method, the master device 210 may be referred to as a first device, the client device 250 may be referred to as a second device, the primary channel 291 may be referred as a first channel, and the downstream channels 293, 294, and 295 may be referred to as second channels ("at least one second channel"). The first channel 291 and second channels 293, 294, 295 described in the method may be associated with a network such as a PLC network 110. At block 310, the method comprises generating a schedule comprising time allocation and channel assignment for the first device 210 and the second device 250. The schedule may be generated by the first device 210 and transmitted to the second device 250. At block 320, the method comprises transmitting, based on the schedule, a first data packet on a first channel 291 from the first device 210 to the second device 250. In some embodiments, the first channel 291 is associated with a frequency equal to or greater than about 2 MHz and less than about 67 MHz. The first channel 291 provides two-way transmission between the first device 210 and the second device 250. At block 330, the method comprises switching, based on the schedule, between the first channel 291 and at least one second channel 293, 294, 295. At block 340, the method comprises transmitting a second data packet on at least one second channel 293, 294, 295 from the first device 210 to the second device 250. In some embodiments, the at least one second channel 293, 294, 295 is associated with a frequency equal to or greater than about 67 MHz. The at least one second channel 293, 294, 295 provides one-way transmission from the master device 210 to the client device 250. In some embodiments, the at least one second channel 293, 294, 295 comprises at least three downstream channels 293, 294, 295. In some embodiments, at block 350, the method further comprises receiving, at the first device 210 and based on the schedule, on the first channel 291 from the second device 250 an acknowledgment for the transmission of the first data packet or the transmission of the second data packet.

While various embodiments in accordance with the disclosed principles have been described above, it should be understood that they have been presented by way of example only, and are not limiting. Thus, the breadth and scope of the embodiments should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the embodiments set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any embodiments in this disclosure. Neither is the "Summary" to be considered as a characterization of the embodiments set forth in issued claims. Furthermore, any reference in this disclosure to "embodiment" in the singular should not be used to argue that there is only a single point of novelty in this disclosure. Multiple embodiments may be set forth according to the limitations of the multiple claims issuing from this disclosure, and such claims accordingly define the embodiments, and their equivalents, that are protected thereby. In all instances, the scope of such claims shall be considered on their own merits in light of this disclosure, but should not be constrained by the headings herein.

What is claimed is:

1. A device for providing communication in multiple frequencies, the device comprising:
    a powerline communication (PLC) transceiver for transmitting or receiving a first data packet on a first channel associated with a first frequency; and
    at least one PLC transmitter for transmitting a second data packet on at least one second channel associated with at least one second frequency,
    wherein the first channel provides a two-way transmission path, and
    wherein the at least one second channel provides a one-way transmission path.

2. The device of claim 1, wherein the at least one second channel comprises at least three second channels.

3. The device of claim 1, wherein the at least one PLC transmitter comprises multiple PLC transmitters.

4. The device of claim 1, wherein the second data packet comprises a data payload and an acknowledgment for receiving the first data packet.

5. The device of claim 1, further comprising a scheduler for generating a schedule comprising time allocation and channel assignment for a second device.

6. The device of claim 1, wherein the first data packet comprises an initial schedule and the second data packet comprises an updated schedule.

7. The device of claim 1, wherein the first frequency is equal to or greater than about 2 MHz and less than about 67 MHz, and wherein the at least one second frequency is equal to or greater than about 67 MHz.

8. The device of claim 1, wherein the PLC transceiver operates simultaneously with the at least one PLC transmitter.

9. The device of claim 1, wherein the device is configured to switch between transmitting over the first channel and transmitting over the at least one second channel.

10. The device of claim 1, wherein the at least one second channel comprises a number of second channels based on a throughput requirement associated with the device.

11. A device for receiving communication in multiple frequencies, the device comprising:
    a powerline communication (PLC) transceiver for transmitting or receiving a first data packet on a first channel associated with a first frequency; and
    a PLC receiver for receiving a second data packet on at least one second channel associated with at least one second frequency,
    wherein the receiver is tuned to the at least one second frequency,
    wherein the first channel provides a two-way transmission path, and
    wherein the at least one second channel provides a one-way transmission path.

12. The device of claim 11, wherein the at least one second channel comprises at least three second channels, and wherein the device is configured to select one second channel from the at least three second channels.

13. The device of claim 11, wherein the PLC receiver comprises multiple PLC receivers.

14. The device of claim 11, wherein the second data packet comprises a data payload and an acknowledgment for transmitting the first data packet.

15. The device of claim 14, wherein at least one intervening packet is transmitted on the first channel between the transmission of the first data packet and the reception of the second data packet.

16. The device of claim 11, wherein the first frequency is equal to or greater than about 2 MHz and less than about 67 MHz, and wherein the at least one second frequency is equal to or greater than about 67 MHz.

17. The device of claim 11, wherein the PLC transceiver operates simultaneously with the PLC receiver.

18. The device of claim 11, further comprising a switch for switching between the first channel and the at least one second channel.

19. The device of claim 11, further comprising a converter for converting data associated with the first frequency to data associated with the at least one second frequency.

20. The device of claim 11, wherein the device is further configured to determine a bit loading for the first channel or the at least one second channel.

21. A method for communicating between a first device and a second device on a network, the method comprising:
    transmitting, via a powerline communication (PLC) transceiver of the first device, a first data packet on a first channel associated with a first frequency from the first device to the second device, the first channel providing a two-way transmission path between the first device and the second device; and
    transmitting, via a PLC transmitter of the first device, a second data packet on at least one second channel associated with at least one second frequency from the first device to the second device, the at least one second channel providing a one-way transmission path from the first device to the second device.

22. The method of claim 21, further comprising receiving on the first channel from the second device an acknowledgment for the transmission of the first data packet or the transmission of the second data packet.

23. The method of claim 21, wherein the at least one second channel comprises at least three second channels.

24. The method of claim 21, further comprising generating a schedule comprising time allocation and channel assignment for the second device.

25. The method of claim 21, further comprising switching between the first channel and the at least one second channel.

* * * * *